United States Patent
Choi et al.

(10) Patent No.: US 9,674,730 B2
(45) Date of Patent: Jun. 6, 2017

(54) METHOD AND APPARATUS FOR DETECTING AND PROCESSING A RETRANSMITTED DATA PACKET IN A WIRELESS NETWORK

(71) Applicant: Marvell World Trade Ltd., St. Michael (BB)

(72) Inventors: Jihwan P. Choi, Daegu (KR); Jiwon S. Han, San Ramon, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 138 days.

(21) Appl. No.: 14/010,304

(22) Filed: Aug. 26, 2013

(65) Prior Publication Data

US 2014/0064098 A1    Mar. 6, 2014

Related U.S. Application Data

(60) Provisional application No. 61/695,380, filed on Aug. 31, 2012.

(51) Int. Cl.
*H04W 28/02* (2009.01)
*H04L 1/18* (2006.01)
(Continued)

(52) U.S. Cl.
CPC ....... *H04W 28/0273* (2013.01); *H04L 1/0001* (2013.01); *H04L 1/1896* (2013.01); *H04L 1/1822* (2013.01); *H04L 5/0053* (2013.01)

(58) Field of Classification Search
None
See application file for complete search history.

(56) References Cited

U.S. PATENT DOCUMENTS

| | | | |
|---|---|---|---|
| 8,976,654 B2 * | 3/2015 | Ankel | H04W 28/12 370/232 |
| 2008/0101312 A1 * | 5/2008 | Suzuki et al. | 370/342 |

(Continued)

FOREIGN PATENT DOCUMENTS

WO    2007079085    7/2007

OTHER PUBLICATIONS

Shane Thomas, International Search Report for PCT Application No. PCT/US13/56679, Nov. 27, 2013, 12 pages.
(Continued)

*Primary Examiner* — Jeffrey M Rutkowski
*Assistant Examiner* — Ning Li (57) ABSTRACT

The present disclosure describes systems and techniques relating to wireless communications. According to an aspect of the described systems and techniques, an apparatus includes circuitry configured to receive a signal representing a wireless communication transmission; and circuitry configured to process the signal to (i) decode a control portion of the wireless communication transmission, (ii) determine from the decoded control portion that a data portion of the wireless communication transmission was successfully decoded previously and acknowledged, and so the wireless communication transmission is an unnecessary retransmission, and (iii) trigger acknowledgement of the wireless communication transmission being successfully decoded, without completing a decode of the data portion of the wireless communication transmission, when the unnecessary retransmission is detected.

16 Claims, 5 Drawing Sheets

(51) Int. Cl.
*H04L 1/00* (2006.01)
*H04L 5/00* (2006.01)

(56) References Cited

U.S. PATENT DOCUMENTS

| | | | |
|---|---|---|---|
| 2008/0186892 A1* | 8/2008 | Damnjanovic | H04W 52/0216 370/311 |
| 2008/0186944 A1* | 8/2008 | Suzuki | H04L 1/1685 370/349 |
| 2008/0279092 A1 | 11/2008 | Hassan et al. | |
| 2009/0052392 A1* | 2/2009 | Sumasu | H04W 36/02 370/331 |
| 2009/0161571 A1* | 6/2009 | Terry | H04L 1/188 370/252 |
| 2009/0175163 A1* | 7/2009 | Sammour | H04W 80/02 370/216 |
| 2009/0175175 A1 | 7/2009 | Somasundaram et al. | |
| 2009/0190480 A1* | 7/2009 | Sammour | H04L 1/1848 370/242 |
| 2009/0300464 A1* | 12/2009 | Shiokawa et al. | 714/758 |
| 2010/0265847 A1* | 10/2010 | Lee et al. | 370/254 |
| 2010/0304733 A1* | 12/2010 | Yi | H04L 1/1874 455/422.1 |
| 2011/0044243 A1* | 2/2011 | Yi et al. | 370/328 |
| 2011/0117905 A1* | 5/2011 | Huang | H04W 76/028 455/422.1 |
| 2011/0176593 A1* | 7/2011 | Hultell et al. | 375/224 |
| 2011/0249601 A1* | 10/2011 | Seo et al. | 370/310 |
| 2011/0261763 A1* | 10/2011 | Chun et al. | 370/329 |
| 2012/0213092 A1* | 8/2012 | Sun et al. | 370/248 |
| 2012/0276896 A1* | 11/2012 | Ren et al. | 455/423 |
| 2012/0276936 A1* | 11/2012 | Ahn et al. | 455/501 |
| 2013/0021982 A1* | 1/2013 | Kim | H04L 1/1887 370/328 |
| 2013/0095748 A1* | 4/2013 | Hu et al. | 455/8 |
| 2013/0136042 A1* | 5/2013 | Chan | 370/310 |
| 2013/0148490 A1* | 6/2013 | Yi | H04B 7/155 370/216 |
| 2013/0329701 A1* | 12/2013 | Bajzec | H04L 1/1887 370/336 |
| 2013/0343255 A1* | 12/2013 | Han | H04L 1/0009 370/312 |
| 2014/0016593 A1* | 1/2014 | Park | H04L 5/001 370/329 |
| 2014/0198744 A1* | 7/2014 | Wang | H04B 7/0617 370/329 |

OTHER PUBLICATIONS

Advanced Lte, "3$^{rd}$ Generation Partnership Project; Technical Specification Group Radio Access Network; Evolved Universal Terrestrial Radio Access (E-UTRA); Radio resource Control (RRC); Protocol specification (Release 10)", Technical Specification 36.331, V10.5.0, Mar. 2012, 301 pages.

Advanced Lte, "3$^{rd}$ Generation Partnership Project; Technical Specification Group Radio Access Network; Evolved Universal Terrestrial Radio Access (E-UTRA); Medium Access Control (MAC) protocol specification (Release 10)", Technical Specification 36.321, V10.5.0, Mar. 2012, 54 pages.

* cited by examiner

METHOD AND APPARATUS FOR DETECTING AND PROCESSING A RETRANSMITTED DATA PACKET IN A WIRELESS NETWORK

CROSS REFERENCE TO RELATED APPLICATIONS

This application claims the benefit of the priority of U.S. Provisional Application Ser. No. 61/695,380, filed Aug. 31, 2012 and entitled "Receiver Processing for Unnecessary HARQ Retransmission", which is hereby incorporated by reference.

BACKGROUND

The present disclosure describes systems and techniques relating to wireless communications.

Wireless communication devices can use one or more wireless communication technologies such as orthogonal frequency division multiplexing (OFDM) or code division multiple access (CDMA). In an OFDM based wireless communication system, a data stream is split into multiple data substreams. Such data substreams are sent over different OFDM subcarriers, which can be referred to as tones or frequency tones. Various examples of wireless communication devices include mobile phones, smart phones, wireless routers, wireless hubs, base stations, and access points. In some cases, wireless communication electronics are integrated with data processing equipment such as laptops, personal digital assistants, and computers.

Wireless communication systems provide mechanisms for data retransmission such as automatic repeat request (ARQ) and hybrid ARQ (HARQ). In ARQ, error detection information bits, e.g., cyclic redundancy check (CRC) bits or checksum bits, are included in a data transmission. A wireless communication device can use error detection bits to detect one or more errors in a decoded version of a received message. In HARQ, error correction bits, such as forward error correction (FEC) bits, are included in a data transmission. A wireless communication device can use error correction bits to correct one or more errors in a decoded version of a received message. A data transmission can include FEC bits and error detection bits. A wireless communication device can use a coding technique such as Reed-Solomon coding, convolutional coding, or turbo coding to encode and decode data. Encoding data may compensate for noise on a wireless communication channel.

When a message is received, the error detection information can indicate a success or a failure. A decoded message that fails error detection is deemed to have failed decoding, whereas a decoded message that passes error detection is deemed to have been successfully decoded. The wireless communication device can use error detection information to select between sending an acknowledgement (ACK) or a negative acknowledgement (NACK) to the device that transmitted the message. When an ACK is received at the original transmitter, it knows the message was received successfully. When a NACK is received, it knows that the message should be retransmitted.

However, in some cases, the message is received successfully and the ACK is sent, but the original transmitter fails to successfully receive the ACK. Thus, the transmitter resends the message, and the receiver processes the repeated message. For example, in a cellular network, a base station, such as an evolved Node B (eNB), can retransmit a message that was previously received and successfully decoded by a wireless device, often referred to as user equipment (UE). The UE then decodes the retransmitted message as before, including the data portion therein.

SUMMARY

The present disclosure describes systems and techniques relating to wireless communications. According to an aspect of the described systems and techniques, an apparatus includes circuitry configured to receive a signal representing a wireless communication transmission; and circuitry configured to process the signal to (i) decode a control portion of the wireless communication transmission, (ii) determine from the decoded control portion that a data portion of the wireless communication transmission was successfully decoded previously and acknowledged, and so the wireless communication transmission is an unnecessary retransmission, and (iii) trigger acknowledgement of the wireless communication transmission being successfully decoded, without completing a decode of the data portion of the wireless communication transmission, when the unnecessary retransmission is detected. In some implementations, the apparatus is a medium access control device, and the circuitry configured to process the signal includes a controller including a processor and embedded program code.

The circuitry configured to process the signal can trigger the acknowledgement of the wireless communication transmission before the decode of the data portion of the wireless communication transmission is begun. The circuitry configured to process the signal can initiate an alternate transmission, which is different from that used with the previously successful decode and acknowledgement, responsive to one or more detected unnecessary retransmissions. Moreover, the wireless communication transmission can be a downlink transmission from a base station to a user device, the control portion of the wireless communication transmission can include hybrid automatic repeat request (HARQ) information, and the circuitry configured to process the signal can be configured to detect the unnecessary retransmission based on an indication of new data and a HARQ process number in the HARQ information.

The base station and the user device can communicate using orthogonal frequency division multiplexing (OFDM). The alternate transmission can include a boosted transmission power of an uplink from the user device to the base station for at least the triggered acknowledgement. The alternate transmission can include a reduced modulation and coding scheme. The alternate transmission can include a radio resource control (RRC) connection reestablishment, and the circuitry configured to process the signal can initiate the RRC connection reestablishment responsive to a number of detected unnecessary retransmissions for a predefined duration exceeding a predefined threshold.

According to another aspect of the described systems and techniques, a method includes: receiving, at a wireless communication device, a signal representing a wireless communication transmission; decoding a control portion of the wireless communication transmission; determining from the decoded control portion that a data portion of the wireless communication transmission was successfully decoded previously and acknowledged, and so the wireless communication transmission is an unnecessary retransmission; and triggering acknowledgement, by the wireless communication device, of the wireless communication transmission being successfully decoded, without completing a decode of the data portion of the wireless communication transmission, when the unnecessary retransmission is detected. In some implementations, the decoding and the determining are performed by a processor and program code embedded in a medium access control controller.

The triggering can include triggering the acknowledgement before the decode of the data portion of the wireless communication transmission is begun. The method can include initiating an alternate transmission, which is different from that used with the previously successful decode and acknowledgement, responsive to one or more detected unnecessary retransmissions. In addition, the wireless communication transmission can be a downlink transmission from a base station to the wireless communication device, the control portion of the wireless communication transmission can include HARQ information, and the determining can include detecting the unnecessary retransmission based on an indication of new data and a HARQ process number in the HARQ information.

The base station and the wireless communication device can communicate using OFDM. The alternate transmission can include a boosted transmission power of an uplink from the wireless communication device to the base station for at least the triggered acknowledgement. The alternate transmission can include a reduced modulation and coding scheme. The alternate transmission can include a RRC connection reestablishment, and the method can include initiating the RRC connection reestablishment responsive to a number of detected unnecessary retransmissions for a predefined duration exceeding a predefined threshold.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, the disclosed embodiments below can be implemented in various systems and apparatus, including, but not limited to, a special purpose data processing apparatus (e.g., a wireless access point, a remote environment monitor, a router, a switch, a computer system component, a medium access unit), a mobile data processing apparatus (e.g., a wireless client, a cellular telephone, a personal digital assistant (PDA), a mobile computer, a digital camera), a general purpose data processing apparatus (e.g., a minicomputer, a server, a mainframe, a supercomputer), or combinations of these.

The described systems and techniques can result in savings for user equipment processing resources, e.g., time and power. In addition, the described systems and techniques can provide increased reliability for two-way communications in wireless networks, such as wireless networks employing HARQ.

Details of one or more implementations are set forth in the accompanying drawings and the description below. Other features, objects and advantages may be apparent from the description and drawings, and from the claims.

DETAILED DESCRIPTION

Figure 1A:
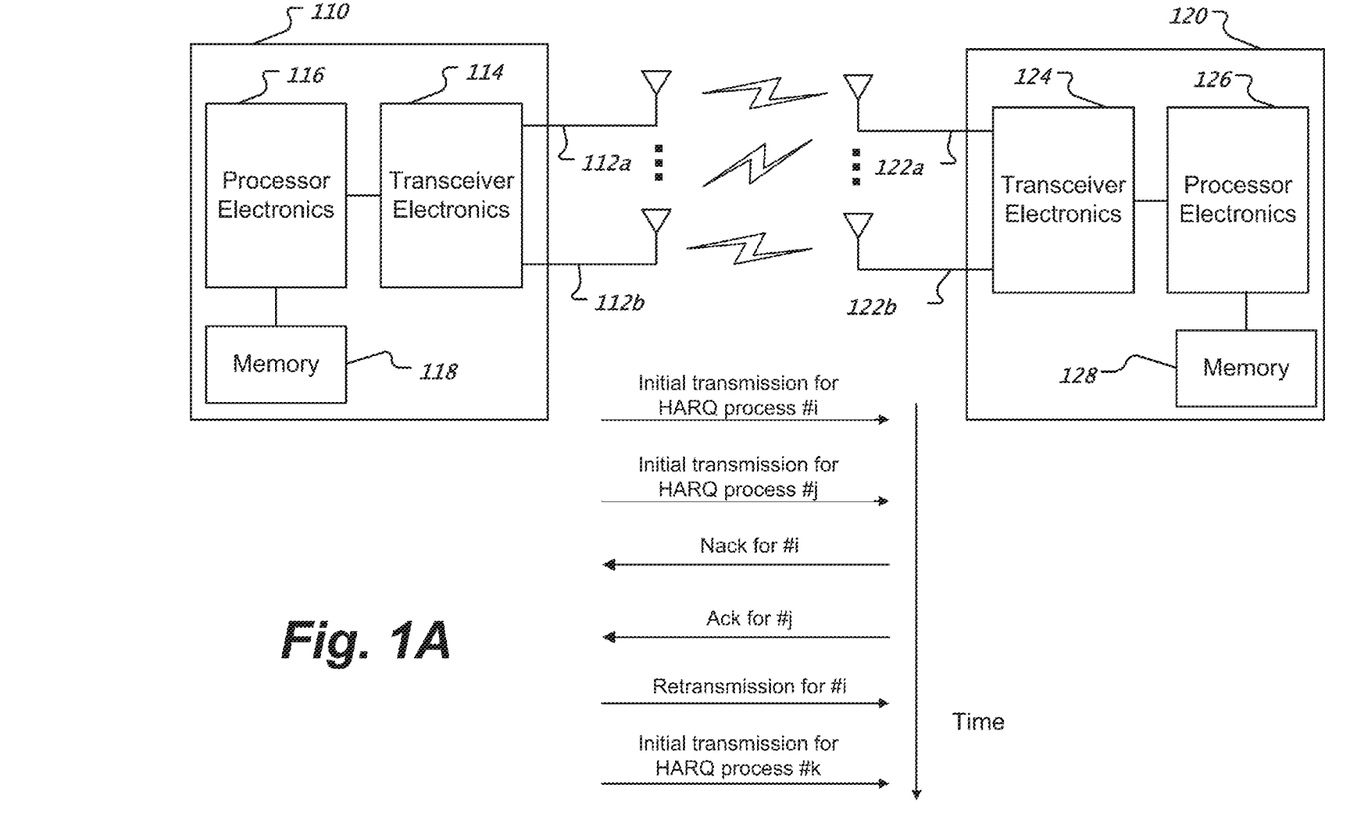
FIG. 1A shows an example of a wireless network with two wireless communication devices and an example of a retransmission protocol.

FIG. 1A shows an example of a wireless network with two wireless communication devices and an example of a retransmission protocol. Wireless communication devices 110 and 120, such as an access point (AP), base station (BS), access terminal (AT), client station, or mobile station (MS) can include processor electronics 116 and 126, such as one or more processors that implement the systems and techniques presented in this disclosure. Wireless communication devices 110, 120 include transceiver electronics 114 and 124 to send and/or receive wireless signals over one or more antennas 112*a*, 112*b*, 122*a*, and 122*b*. In some implementations, transceiver electronics 114, 124 include multiple radio units. In some implementations, a radio unit includes a baseband unit (BBU) and a radio frequency unit (RFU) to transmit and receive signals. Wireless communication devices 110, 120 can also include one or more memories 118 and 128 configured to store information such as data and/or instructions. In some implementations, wireless communication devices 110, 120 include dedicated circuitry for transmitting and dedicated circuitry for receiving.

A first wireless communication device 110 can transmit data over multiple wireless channels to a second wireless communication device 120. In some implementations, the first wireless communication device 110 implements a frequency division technique to transmit data to the second wireless communication device 120 using two or more wireless channels operated at different frequency bands. In some implementations, the first wireless communication device 110 implements a time division technique to transmit data to the second wireless communication device 120 using separate time slots into a shared frequency band. In some implementations, the first wireless communication device 110 implements a space division technique to transmit data to the second wireless communication device 120 using two or more multiplexing matrices to provide spatially separated wireless channels in a single frequency band.

Wireless communication devices 110, 120 in a wireless network, e.g., a wireless local area network (WLAN), can use one or more protocols for Medium Access Control (MAC) and Physical (PHY) layers. For example, a wireless communication device can use a Carrier Sense Multiple Access (CSMA) with Collision Avoidance (CA) based protocol for a MAC layer and OFDM for the PHY layer. The wireless communication devices 110, 120 can be configured for one or more wireless communication techniques such as single-input single-output (SISO), multi-input multi-output (MIMO), bit-level combining, and symbol-level combining. A MIMO-based wireless communication device can transmit and receive multiple spatial streams over multiple antennas in each of the tones of an OFDM signal.

The wireless communication devices 110, 120 are sometimes referred to as transmitters and receivers for convenience. For example, a "transmitter" as used herein refers to a wireless communication device that receives and transmits signals. Likewise, a "receiver" as used herein refers to a wireless communication device that receives and transmits signals. Moreover, in some implementations, the wireless communication devices 110, 120 run a communication process that uses hybrid automatic repeat request (HARQ) for retransmission.

HARQ is designed to ensure correct reception by retransmission of transport blocks (i.e., data packets) that have been transmitted but erroneously received. Acknowledgement (ACK) or negative acknowledgement (NACK) signaling from the receiver to the transmitter provides notification of whether or not the reception was successful. Such retransmission protocols are important features deployed in wireless networks, such as LTE (Long-Term Evolution, often referred to as 4G, which employs OFDM technology), WiMAX (Worldwide Interoperability for Microwave Access), and HSDPA (High-Speed Downlink Packet Access, often referred to as 3.5G, 3G+ or turbo 3G, which employs CDMA technology).

As shown in the HARQ example in FIG. 1A, an initial transmission for HARQ process #i is sent from the transmitter to the receiver. The HARQ process number can be tracked by packet or time, and the transmitter can keep track of multiple numbers of HARQ processes. Thus, an initial transmission for HARQ process #j is also sent from the transmitter to the receiver. Each different HARQ process number can have different time of transmission and reception scheduling and can have different content (e.g., a Hypertext Transfer Protocol (HTTP) communication or a Voice Over Internet Protocol (VOIP) communication) or the same content, (e.g., a large packet that has been broken up into pieces).

The receiver doesn't successfully receive process i, but does successfully receive process j. Thus, the receiver sends a NACK for process i and an ACK for process j. If the transmitter successfully receives both the ACK and the NACK, the transmitter will send a retransmission for process i, and the transmitter will schedule a new process transmission, thus sending an initial transmission for HARQ process #k. However, in some cases, the ACK is lost or received erroneously by the original transmitter, and so the transmitter will send a retransmission for process j, rather than schedule a new process. In such cases, the receiver (e.g., wireless communication devices 120) detects the unnecessary retransmission of previously decoded packets and takes further actions to make future transmissions more robust.

Various details of such detection and further actions are described below. These described systems and techniques can be implemented in one or more devices (e.g., a wireless communication device, an electronic data storage device, a channel medium access access/control device). Such devices can include processor electronics 116 and 126, which can further include one or more integrated circuit (IC) devices. For example, the systems and techniques disclosed can be implemented in a WLAN transceiver device (e.g., a WLAN chipset) suitable for use in an OFDM MIMO system.

Furthermore, the systems and techniques disclosed are applicable to general cellular and wireless network systems that deploy HARQ, and while the following description focuses on HARQ, other non-HARQ implementations are also possible.

Figure 1B:
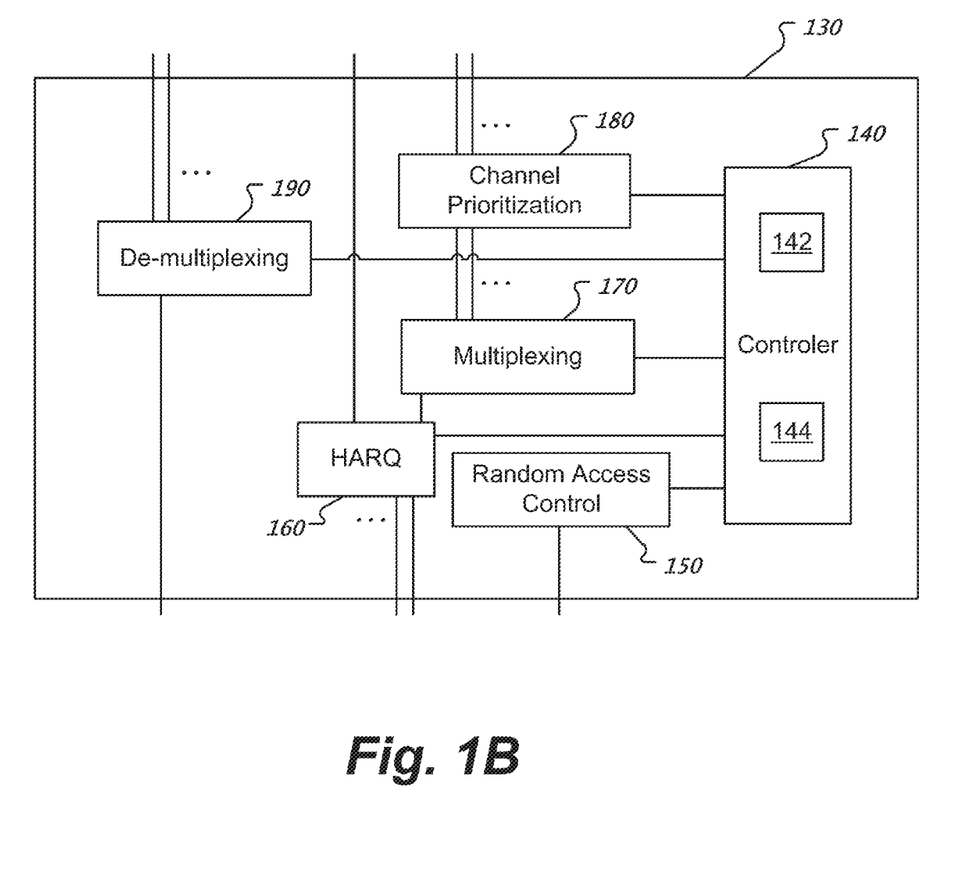
FIG. 1B shows an example of a Medium Access Control (MAC) structure for user equipment (UE) in a wireless communication network

FIG. 1B shows an example of a MAC structure 130 for user equipment (UE) in a wireless communication network. The elements of the MAC structure 130 can form a MAC control unit (MCU), one of two or more MCUs, or can include addition elements forming one or more additional MCUs. The MAC structure 130 provides an interface between one or more lower layers and one or more upper layers in a wireless communication device. In some implementations, the MAC structure 130 connects with multiple BBUs, which connect with multiple RFUs, which connect with an antenna module. In some implementations, the MAC structure 130 handles various transport channels, including a broadcast channel, one or more downlink shared channels, a paging channel, one or more uplink channels, one or more random access channels, and one or more multicast channels.

The MAC structure 130 can include a de-multiplexing unit 190, a channel prioritization unit 180 (for uplink communications), a multiplexing unit 170, a HARQ unit 160, a random access control unit 150, and a controller 140. The controller 140 orchestrates the activities of the MAC elements, including detection of the unnecessary HARQ retransmission. In some implementations, the controller 140 includes one or more processors 142 and embedded program code 144 (e.g., firmware) that effects detection of unnecessary HARQ retransmissions and actions taken in response thereto.

The controller 140 can detect an unnecessary HARQ retransmission in a downlink transmission. This can be done by decoding only the control channel, which can arrive first and describes the packet data. The controller 140 can use this information to determine that the packet data was decoded successfully from a previous transmission and thus need not be decoded again. This can result in savings on power consumption and processing time. In addition, in response to this determination, the controller 140 can cause a future uplink transmission to be more robust. This can be done by the UE in an autonomous manner in a wireless communication system.

Figure 2A:
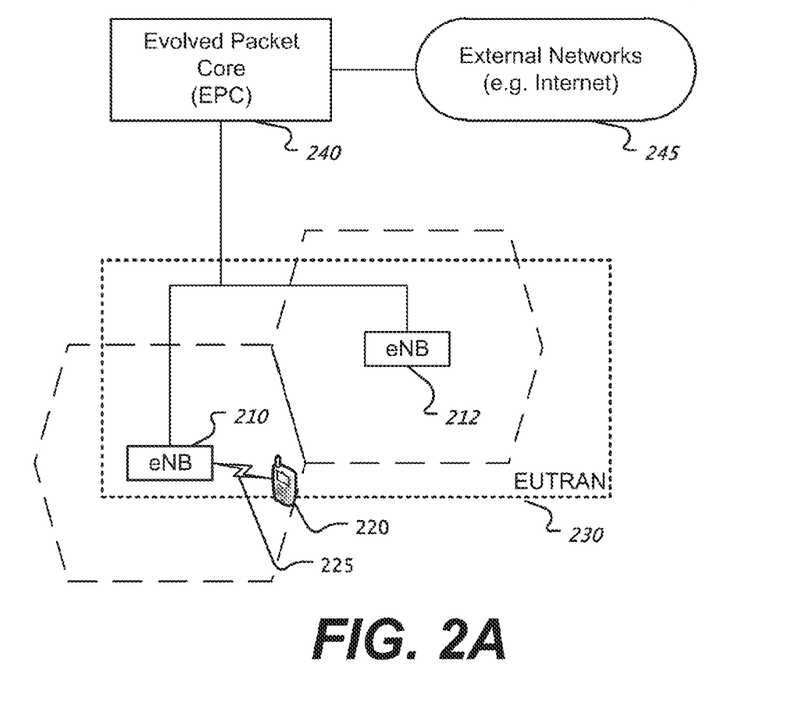
FIG. 2A shows an example of a wireless communication system.

FIG. 2A shows an example of a wireless communication system 200. In this example, the wireless communication system 200 is based on the 3GPP LTE standard, although it will be appreciated that the present disclosure is not limited to the LTE environment. The wireless communication system 200 can include one or more cellular networks 230 made up of a number of radio cells, or cells that are each served by a base station, such as evolved Node B (eNB) base stations 210 and 212. The cells are used to cover different areas in order to provide radio coverage over an area. Wireless communication devices operated in the cellular radio coverage areas that are served by the base stations 210, 212, such as device 220, can be referred to as user equipment (UE). The wireless communication system 200 shown in FIG. 2A includes two base stations 210, 212 (other numbers of base stations are possible) included in a radio access network (RAN) that is known as an evolved UMTS Terrestrial Radio Access Network (eUTRAN) 230. In the LTE example of FIG. 2A, the base stations are shown as eNB base stations 210, 212. The eUTRAN 230 includes the eNB base stations 210, 212.

A base station 210 can operate in a mobile environment such as a femto-cell, pico-cell, or the base station 210 can operate as a node that can relay signals for other mobile and/or base stations. Base stations 210, 212 can provide wireless services to one or more wireless communication devices 220. Base stations 210, 212 can communicate with each other and with a core network called an evolved packet core (EPC) 240. The EPC 240 can provide wireless communication devices with access to an external network 245, such as the Internet. The EPC 240 can include a mobility management entity (MME). The MME can be the main control element in the EPC 240 responsible for the functionalities, such as the control plane functions related to subscriber and session management. In some implementations, the wireless communication system 200 can include multiple radio access technologies such as WCDMA (Wideband Code Division Multiple Access), UMTS (Universal Mobile Telecommunications System), CDMA2000, and GSM (Global System for Mobile communications).

The eNB base stations 210, 212 communicate directly with the UE 220. The UE 220 can be a cellular phone, personal digital assistant (PDA), smartphone, laptop, tablet computer, or other wireless communications device. Further, UEs 220 can include pagers, portable computers, Session Initiation Protocol (SIP) phones, one or more processors within devices, or any other suitable processing devices capable of communicating information using a radio technology. UE 220 can communicate directly with a serving base station to receive service when UE 220 is operated within the cell associated with the corresponding serving station. UE 220 can also receive radio signals from base stations neighboring the serving base station. The UE 220 generates requests, responses or otherwise communicates with the EPC 240 and the external network 245 via one or more eNB base stations 210, 212.

These communications include wireless communication transmissions 225 between eNB 210 and UE 220 (e.g., OFDM transmissions). The eNB 210 sends an initial transmission, which the UE 220 successfully decodes. The UE 220 sends an ACK, but the eNB 210 fails to receive the wireless signal or receives the signal but fails to successfully recognize the signal as the ACK from UE 220. Thus, the eNB 210 send a retransmission of the same data sent previously. The UE 220 then receives this retransmission, determines that it was unnecessary since the data being sent has already been received successfully, and concludes that the uplink between the UE 220 and the eNB 210 may have a problem that needs to be addressed (e.g., by adjusting the uplink signal) since the ACK was not received properly. Note that this conclusion may be made after detection of the first unnecessary retransmission, or only after receipt of more than one unnecessary retransmission. In general, the UE 220 is not encouraged to adopt autonomous transmission behaviors without initiation by the eNB 210, so it may be beneficial to initiate the additional actions by the UE 220, such as described herein, only after careful consideration of the specific wireless environment.

Figure 2B:
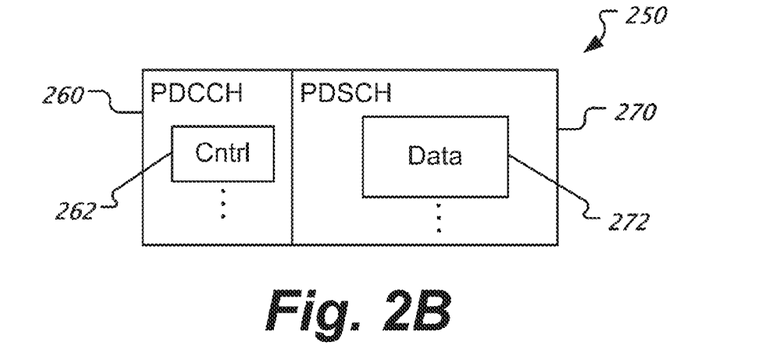
FIG. 2B shows an example of a format for a wireless communication transmission.

FIG. 2B shows an example of a format 250 for a wireless communication transmission. This format 250, which applies to the unnecessary retransmission addressed above, is for an OFDM communication and includes a Physical Download Control Channel (PDCCH) 260 followed by a Physical Download Shared Channel (PDSCH) 270. The PDCCH 260 includes control information 262, which includes a pointer to corresponding data 272 in the PDSCH 270, and also includes process number information, e.g., the HARQ number, and an indication of new data, e.g., a New Data Indicator (NDI) flag. From this information, it can be determined whether or not the data 272 has been successfully decoded previously.

Figure 3A:
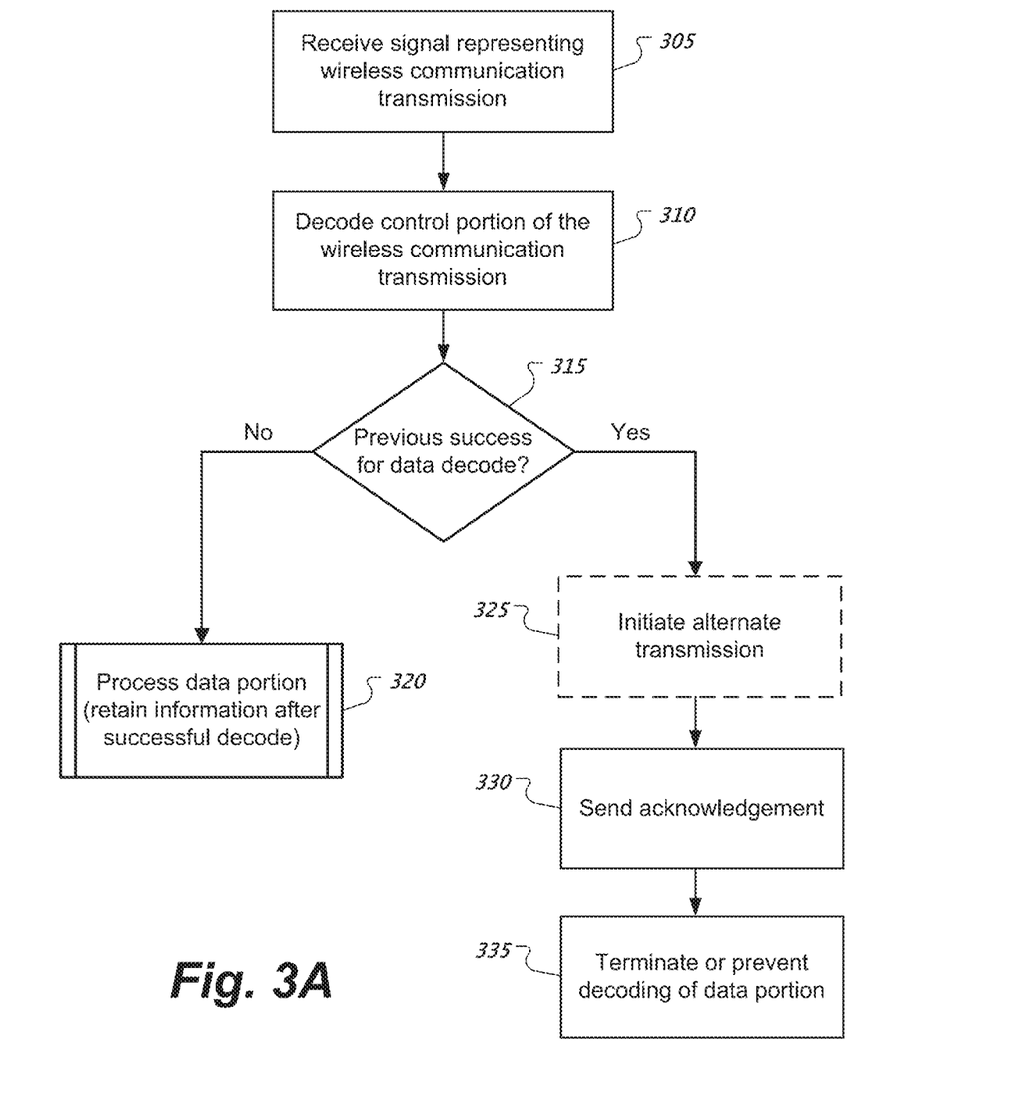
FIG. 3A is a flowchart showing an example of a process for handling an unnecessary retransmission.

FIG. 3A is a flowchart showing an example of a process for handling an unnecessary retransmission. At 305, a signal representing a wireless communication transmission is received at a wireless communication device. The wireless communication device can be UE 220, a component of such UE 220, a base station, or a component of a base station. While much of this description focuses on the UE (e.g., the UE 220 in a 3GPP LTE network) as a downlink packet receiver, the systems and techniques are applicable to the base station as well (e.g., the eNB 210, which can control all the UE scheduling, such as downlink MCS change, downlink power boost and UE handover, which are described further below in connection with FIG. 3B). In addition, the received signal may be a processed version (e.g., filtered and amplified) of the RF signal received on one or more antennas.

A control portion of the wireless communication transmission is decoded at 310. This decoding may be completed before any processing of the data portion of the signal is begun, or decoding of the data portion may begin after a sufficient amount of the control portion is decoded, and the two decoding operations may then occur in parallel. In any case, at 315, a determination is made from the decoded control portion that a data portion of the wireless communication transmission was successfully decoded previously and acknowledged, and so the wireless communication transmission is an unnecessary retransmission. For example, an NDI flag and a HARQ process number can be checked against stored information to make this determination.

If the data portion of the wireless communication transmission was not successfully decoded previously, then the data portion is fully processed at 320. In addition, after a successful decoding, information is retained for later use in identifying any unnecessary retransmission of the same data. For example, the NDI and HARQ number of the data received can be decoded and stored in memory until new data reception for the same HARQ number happens. If retransmission is necessary, the same HARQ number can be used to indicate the same data transmitted. Once the retransmission is not needed any more for the specific data, the HARQ number can be used for other new data with the NDI bit set to indicate new data transmission.

If the data portion of the wireless communication transmission was successfully decoded previously, then in some implementations, an alternate transmission is initiated at 325. An alternate transmission is different (in at least some fashion) from that used with the previously successful decode and acknowledgement. Such alternate transmissions are optional and can be performed responsive to one or more detected unnecessary retransmissions. Further details of such alternate transmissions are described below in connection with FIG. 3B.

At 330, an acknowledgement is triggered to indicate the successful decoding, without actually completing a decode of the data portion of the wireless communication transmission, since the data therein was decoded successfully before this retransmission was received. At 335, decoding of the data portion is either terminated (e.g., if it has been allowed to begin) or prevented (e.g., if the decode of the data portion has not yet started when the unnecessary retransmission is detected). In some implementations, no data packet decoding is performed (even partially) for an unnecessary retransmission.

Figure 3B:
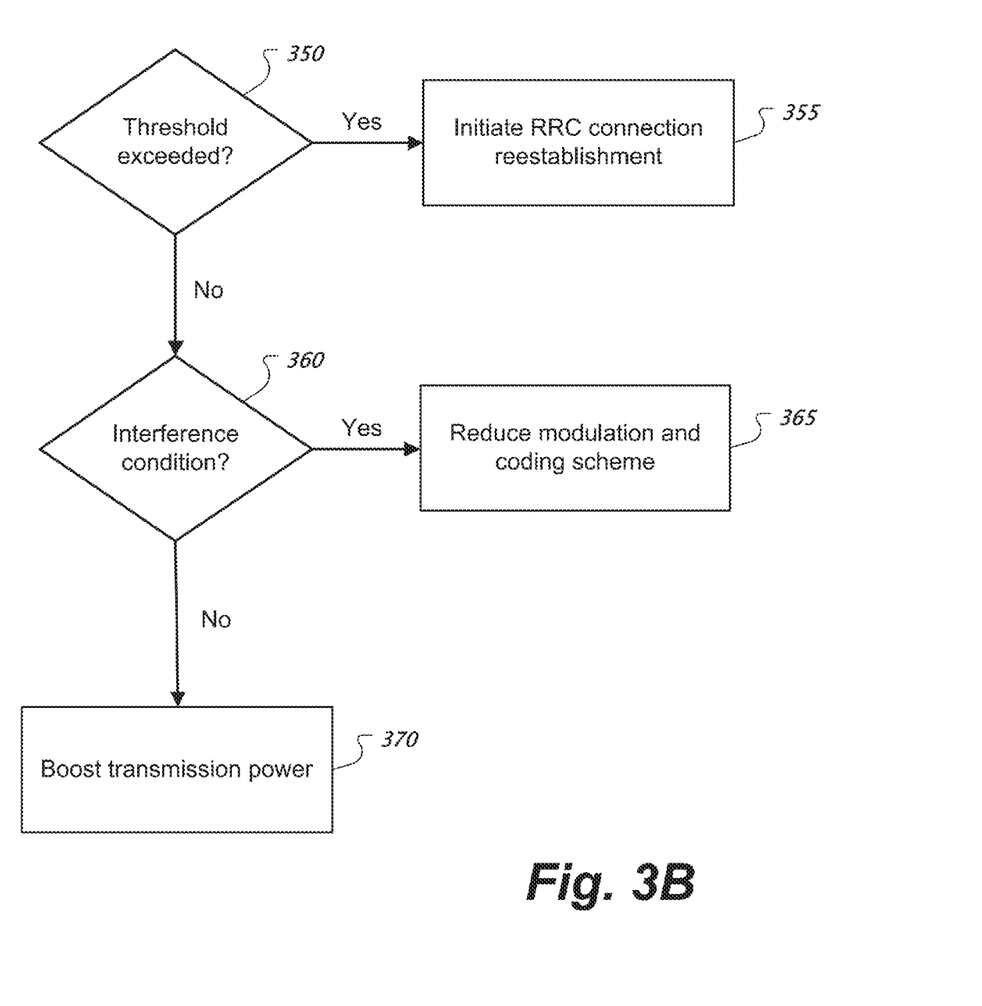
FIG. 3B is a flowchart showing an example of a process for initiating alternate transmissions in response to an unnecessary retransmission.

FIG. 3B is a flowchart showing an example of a process for initiating alternate transmissions in response to an unnecessary retransmission. At 350, a check is made as to whether a number of detected unnecessary retransmissions exceeds a threshold. This can involve checking whether the number of detected unnecessary retransmissions exceeds a predefined threshold within a predefined time duration. For example, the check can be whether more than five unnecessary retransmissions have been detected within the last fifty microseconds.

If the threshold has been exceeded, a radio resource control (RRC) connection reestablishment can be initiated at 355. For example, UE 220 may initiate handover. In some cases, the current channel may be of such low quality that it should be treated as radio link failure. It may be preferable to disconnect on the current channel and seek another channel, e.g., the continuing problem indicates the UE 220 should conclude that the uplink channels to the current serving eNB 210 are not good enough. Thus, the UE 220 can behave as if consecutive uplink data transmissions, such as PRACH (physical random access channel) have failed.

If the threshold has not been exceeded, a check can be made at 360 regarding current interference conditions since boosting the transmission power may not be appropriate in the current wireless environment. In some implementations, boosting the uplink power can be done in a conservative manner. For example, the UE 220 can keep a timer for initiating power boost, where this timer is set longer than a timer used for reducing MCS (modulation and coding scheme) in a CQI (Channel Quality Indicator) report (discussed in further detail below).

If an interference condition is not of concern, then the transmission power can be boosted at 370. This power boost can be applied to an uplink from a wireless communication device to a base station for the acknowledgement of the unnecessary retransmission. This will make the signal stronger, thus increasing the likelihood of the ACK being received by the base station. The power boost can also be applied to other transmissions. For example, the power boost can be applied to control signals, data channels, sounding signals, or a combination of these.

If there is an interference condition, then the modulation and coding scheme can be reduced at 365. For example, the MCS in a CQI report can be reduced. In some implementations, the eNB may reflect the downlink channel condition in the CQI report into uplink power control and MCS scheduling. Thus, the signal will be more robust in the next transmission. This can be of use in time division multiplexing channels with channel reciprocity (uplink and downlink share the same frequency). Moreover, in some implementations, the transmission type can be switched, such as from 16 QAM (Quadrature Amplitude Modulation) to QPSK (Quadrature Phase-Shift Keying).

While the alternate transmissions are described above as operating together, they need not be deployed together. Each of the alternate transmission types can be employed separately in various implementations, or in various combinations other than what is described above.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. An apparatus comprising:
    circuitry configured to receive a signal representing a wireless communication transmission; and
    circuitry configured to process the signal to decode a control portion of the wireless communication transmission, determine from the decoded control portion that a data portion of the wireless communication transmission was successfully decoded previously and acknowledged in an initial acknowledgement, and so the wireless communication transmission is an unnecessary retransmission, trigger a subsequent acknowledgement of the wireless communication transmission being successfully decoded, start a decode of the data portion of the wireless communication transmission, and terminate the decode of the data portion of the wireless communication transmission, when the unnecessary retransmission is detected, and initiate, responsive to at least the unnecessary retransmission, a radio resource control (RRC) connection reestablishment to transmit the subsequent acknowledgement, wherein the RRC connection reestablishment causes the initial acknowledgement and the subsequent acknowledgement to be transmitted via different RRC connections.

2. The apparatus of claim 1, wherein the apparatus is a medium access control device, and the circuitry configured to process the signal comprises a controller including a processor and embedded program code.

3. An apparatus comprising:
circuitry configured to receive a signal representing a wireless communication transmission; and
circuitry configured to process the signal to decode a control portion of the wireless communication transmission, determine from the decoded control portion that a data portion of the wireless communication transmission was successfully decoded previously and acknowledged in an initial acknowledgement, and so the wireless communication transmission is an unnecessary retransmission, when the unnecessary retransmission is detected, trigger a subsequent acknowledgement of the wireless communication transmission being successfully decoded before a decode of the data portion of the wireless communication transmission is begun and prevent the decode of the data portion of the wireless communication transmission for the unnecessary retransmission, and initiate, responsive to at least the unnecessary retransmission, a radio resource control (RRC) connection reestablishment to transmit the subsequent acknowledgement, wherein the RRC connection reestablishment causes the initial acknowledgement and the subsequent acknowledgement to be transmitted via different RRC connections.

4. The apparatus of claim 3, wherein the wireless communication transmission is a downlink transmission from a base station to a user device, the control portion of the wireless communication transmission includes hybrid automatic repeat request (HARQ) information, and the circuitry configured to process the signal is configured to detect the unnecessary retransmission based on an indication of new data and a HARQ process number in the HARQ information.

5. The apparatus of claim 4, wherein the base station and the user device communicate using orthogonal frequency division multiplexing (OFDM).

6. The apparatus of claim 4, wherein the circuitry configured to process the signal is configured to boost a transmission power of an uplink from the user device to the base station to transmit an acknowledgement.

7. The apparatus of claim 4, wherein the circuitry configured to process the signal is configured to use a reduced modulation and coding scheme to transmit an acknowledgement.

8. The apparatus of claim 3, wherein the circuitry configured to process the signal initiates the RRC connection reestablishment responsive to a number of detected unnecessary retransmissions for a predefined duration exceeding a predefined threshold.

9. A method comprising:
receiving, at a wireless communication device, a signal representing a wireless communication transmission;
decoding a control portion of the wireless communication transmission;
starting a decode of a data portion of the wireless communication transmission;
determining from the decoded control portion that the data portion of the wireless communication transmission was successfully decoded previously and acknowledged in an initial acknowledgement, and so the wireless communication transmission is an unnecessary retransmission;
triggering a subsequent acknowledgement, by the wireless communication device, of the wireless communication transmission being successfully decoded, and terminating the decode of the data portion of the wireless communication transmission, when the unnecessary retransmission is detected; and
initiating, responsive to at least the unnecessary retransmission, a radio resource control (RRC) connection reestablishment to transmit the subsequent acknowledgement, wherein the RRC connection reestablishment causes the initial acknowledgement and the subsequent acknowledgement to be transmitted via different RRC connections.

10. The method of claim 9, wherein the decoding and the determining are performed by a processor and program code embedded in a medium access control controller.

11. A method comprising:
receiving, at a wireless communication device, a signal representing a wireless communication transmission;
decoding a control portion of the wireless communication transmission;
determining from the decoded control portion that a data portion of the wireless communication transmission was successfully decoded previously and acknowledged in an initial acknowledgement, and so the wireless communication transmission is an unnecessary retransmission;
when the unnecessary retransmission is detected, triggering a subsequent acknowledgement, by the wireless communication device, of the wireless communication transmission being successfully decoded before a decode of the data portion of the wireless communication transmission is begun and preventing the decode of the data portion of the wireless communication transmission for the unnecessary retransmission; and
initiating, responsive to at least the unnecessary retransmission, a radio resource control (RRC) connection reestablishment to transmit the subsequent acknowledgement, wherein the RRC connection reestablishment causes the initial acknowledgement and the subsequent acknowledgement to be transmitted via different RRC connections.

12. The method of claim 11, wherein the wireless communication transmission is a downlink transmission from a base station to the wireless communication device, the control portion of the wireless communication transmission includes hybrid automatic repeat request (HARQ) information, and the determining comprises detecting the unnecessary retransmission based on an indication of new data and a HARQ process number in the HARQ information.

13. The method of claim 12, wherein the base station and the wireless communication device communicate using orthogonal frequency division multiplexing (OFDM).

14. The method of claim 12, comprising: boosting a transmission power of an uplink from the wireless communication device to the base station to transmit an acknowledgement.

15. The method of claim 12, comprising: using a reduced modulation and coding scheme to transmit an acknowledgement.

16. The method of claim 11, wherein initiating the RRC connection reestablishment is responsive to a number of detected unnecessary retransmissions for a predefined duration exceeding a predefined threshold.

* * * * *